(12) United States Patent
Shmilovich et al.

(10) Patent No.: US 12,000,741 B2
(45) Date of Patent: Jun. 4, 2024

(54) PLUGGABLE SENSOR DEVICE FOR MEASURING PROPERTIES OF FLUID SUBSTANCE

(71) Applicant: EZMEMS LTD., Caesarea (IL)

(72) Inventors: Tsvi Shmilovich, Pardes Hanna-Karkur (IL); Nicola Molinazzi, Kfar Sava (IL)

(73) Assignee: EZMEMS LTD., Caesarea (IL)

( * ) Notice: Subject to any disclaimer, the term of this patent is extended or adjusted under 35 U.S.C. 154(b) by 404 days.

(21) Appl. No.: 17/290,959

(22) PCT Filed: Nov. 3, 2019

(86) PCT No.: PCT/IL2019/051195
§ 371 (c)(1),
(2) Date: May 3, 2021

(87) PCT Pub. No.: WO2020/089915
PCT Pub. Date: May 7, 2020

(65) Prior Publication Data
US 2021/0325271 A1    Oct. 21, 2021

Related U.S. Application Data

(60) Provisional application No. 62/755,455, filed on Nov. 3, 2018.

(51) Int. Cl.
*G01L 13/02* (2006.01)
*G01L 13/06* (2006.01)
(Continued)

(52) U.S. Cl.
CPC .......... *G01L 13/025* (2013.01); *G01L 19/003* (2013.01); *G01L 19/086* (2013.01); *G01L 13/06* (2013.01)

(58) Field of Classification Search
None
See application file for complete search history.

(56) References Cited

U.S. PATENT DOCUMENTS

| | | |
|---|---|---|
| 6,615,665 B1 | 9/2003 | Flogel et al. |
| 10,584,994 B2 * | 3/2020 | Thuillier ............. G01N 33/497 |

(Continued)

FOREIGN PATENT DOCUMENTS

| | | |
|---|---|---|
| WO | 2018/025264 A1 | 2/2018 |
| WO | 2018/092130 A1 | 5/2018 |
| WO | 2018/235087 A1 | 12/2018 |

*Primary Examiner* — Peter J Macchiarolo
*Assistant Examiner* — Jermaine L Jenkins
(74) *Attorney, Agent, or Firm* — Browdy and Neimark, PLLC

(57) ABSTRACT

A sensor device for measuring properties and/or conditions of one or more fluid substances contained, or streamed, inside a fluid vessel, is disclosed. The sensor device generally comprises a main body portion an attachment portion. The main body portion comprises a cavity and at least one sensing element operatively mounted inside the cavity for measuring the properties and/or conditions of the one or more fluid substances and generating data/signals indicative thereof. The attachment portion comprises at least one fluid passage and it is configured to establish fluid communication between a cavity or lumen of the fluid vessel and the cavity of the main body portion through the at least one fluid passage, to thereby enable the one or more fluid substances to interact with the at least one sensing element upon attachment of said sensor device to the fluid vessel.

18 Claims, 6 Drawing Sheets

(51) Int. Cl.
  *G01L 19/00* (2006.01)
  *G01L 19/08* (2006.01)

(56) References Cited

U.S. PATENT DOCUMENTS

2014/0224028 A1* 8/2014 Lux .................. G01L 19/148
                                                    73/728
2016/0339431 A1  11/2016 Shmilovich et al.

* cited by examiner

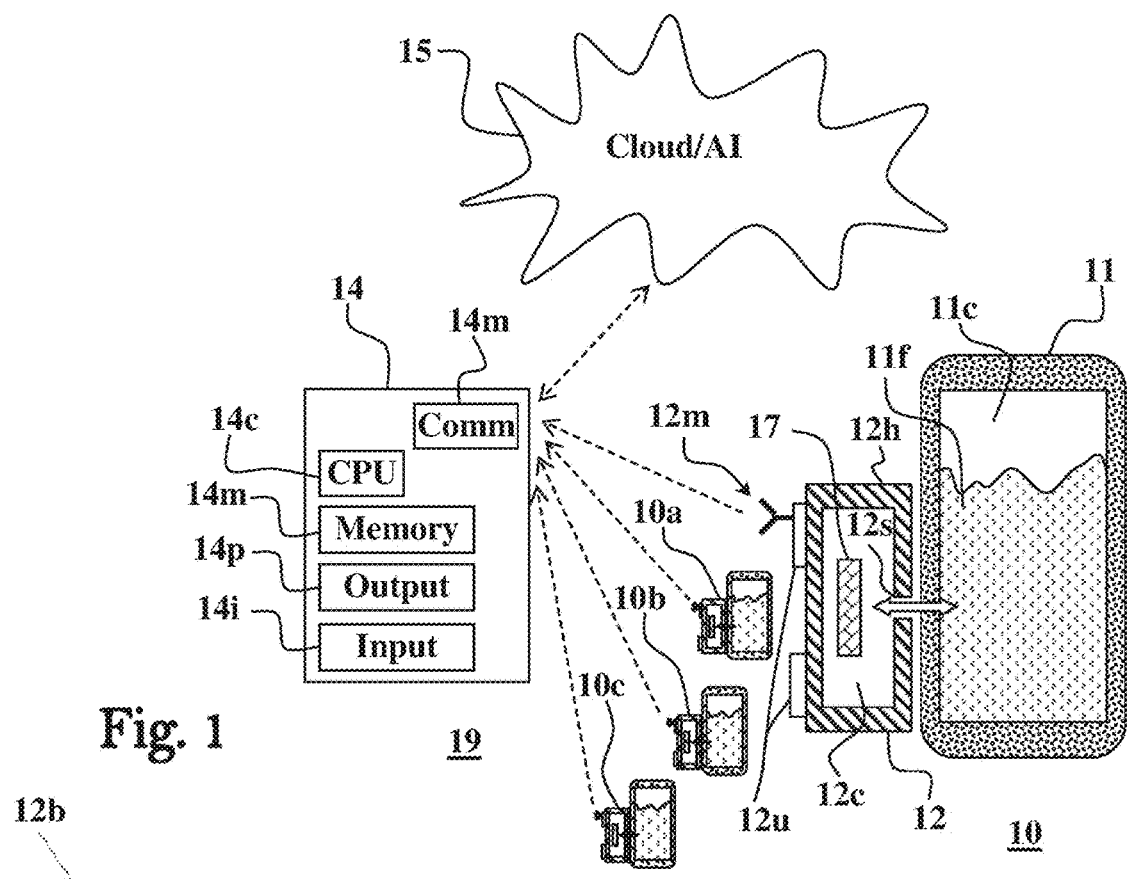
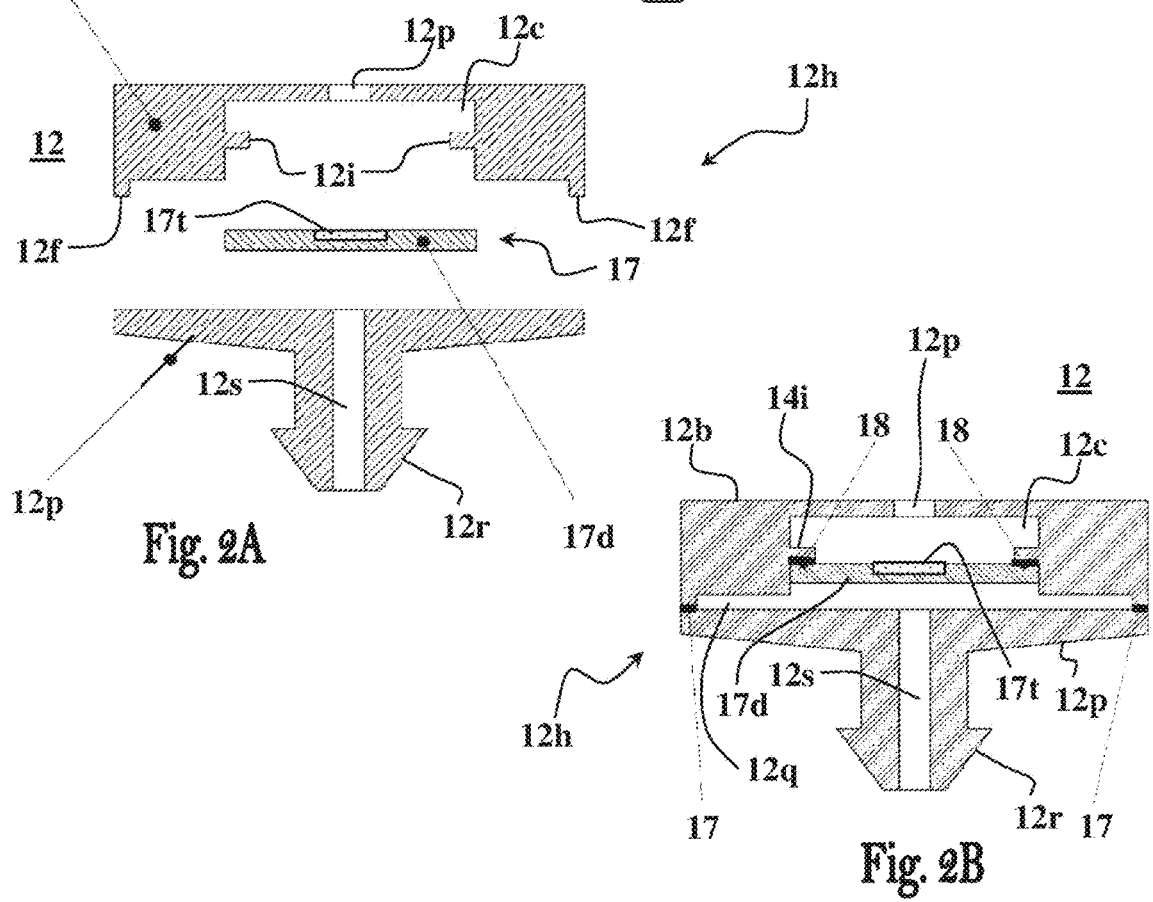

PLUGGABLE SENSOR DEVICE FOR MEASURING PROPERTIES OF FLUID SUBSTANCE

TECHNOLOGICAL FIELD

The present invention is generally in the field of sensor devices, and in particular relates to configurations and fabrication of sensors for measuring properties and/conditions of fluid substances.

BACKGROUND

Small size sensor devices for measuring properties/conditions of fluid substances usually employ sensor elements implemented by semiconductor structures, which are not suitable for direct integration into fluidic devices and/or appliances.

In the age of sensors and IoT (internet of things), where sensors are everywhere and everything is being sensed, the deployment of a large number of sensors in plastics (e.g., medical, pharma, food, beverages, agriculture, industry, packaging) requires use of small, compact, inexpensive and disposable, sensor elements. Products manufactured from plastic materials usually lack sensing capabilities because Silicon MEMS (microelectromechanical systems) sensors cannot be integrated into plastic products without dramatically increasing costs.

The present application provides small sized sensor devices, and possible configurations for implementing from such sensor devices small sized fluidic sensor devices and appliances.

General Description

The present application relates to pluggable sensor devices configured for measurement of properties and/or conditions of fluid substances maintained in, or streamed through, a fluid vessel (e.g., container, conduit, tube, body passageway). Particularly, the pluggable sensor devices disclosed herein are configured for instant attachment to a fluid vessel, and establishment of fluid communication with a lumen or cavity of the fluid vessel in which the fluid substances are maintained or flow. This way, upon attachment of the pluggable sensor device to the fluid vessel, the fluid substances maintained/flowing inside the fluid vessel interact with sensor elements mounted and/or integrated inside the pluggable sensor device and properties and/or conditions of these fluid substances are thereby measured.

Optionally, but in some embodiments preferably, the pluggable sensor devices are made from polymeric materials. The packaging of these pluggable sensor devices can include polymeric channels and/or polymeric structures formed therein to perform the measurements, and/or to allow additional functionality (e.g., liquid passage, pressure release, mechanical connectivity). In some embodiments the pluggable sensor devices are configured as pressure sensors utilizing a deformable element (e.g., implemented by a polymeric diaphragm) having specific materials and patterns of deposition applied over at least one side thereof for pressure transduction. These sensor devices include in some embodiments various sensing elements and connectivity modules/elements (mechanical, electrical, wired and/or wireless communication) configured to enable the pluggable sensor device to exchange data/signals with external modules/devices.

The embodiments disclosed herein permit intuitive and simple integration of sensing elements in simple plastic products by allowing the sensing elements to be embedded within the plastic products, unlike in common MEMS silicon sensors. Instead of packaging the sensing elements to get a standalone sensing device, the sensing elements are directly formed inside the plastic parts of the device. Instead of using expensive and slow-to-market semiconductor fab, in some embodiments the sensor elements can be implemented as plated foils/films, or even in a roll-to-roll process, to get a roll of sensor elements instead of a wafer of sensor elements.

Direct integration of the sensor elements into plastic parts enables dramatic cost reduction, compact geometrical size, quick and easy integration of the sensor elements within plastic products, robustness, ability to operate in different types of environments, easy customization, fast go to market, and/or ability to sense multiple parameters with the same pluggable sensor device. These advantages are obtained with excellent measurement characteristics, similar to the conventional semiconductor-based high-end sensor devices currently available in the market.

The dramatic cost reduction is achievable due to the innovative manufacturing approach, which eliminates the packaging costs (70-90% of the costs of existing semiconductor-based sensor devices) inevitably required for packaging conventional semiconductor-based sensing elements (e.g., to allow mechanical transduction, and to simultaneously isolate sensing components made of Silicon from the fluid substances, for example, by means of a gel or other separation mean), and which allows manufacturing the sensing components on/in substrates other than (Silicon) semiconductor fab. In addition, the integration process of the sensor element into its working environment in the disclosed embodiments, is much simple and cost effective.

Optionally, but in some embodiments preferably, the deformable element of the pluggable sensor device is made from a multilayered foil/film, configured to provide specific mechanical and electrical characteristics to the deformable element. When the deformable element is deformed in response to pressure conditions evolving inside the pluggable sensor device, one or more measurable electrical properties (e.g., resistance, capacitance, inductance) thereof are correspondingly changed, which are indicative of the strain occurring in the deformable element. The strain of the deformable element can be quantitatively measured based on a known (or experimentally determined) gauge factor(s) of the sensor element(s).

For example, and without being limited, a change in the electrical resistance of the sensing element is measured in some embodiment using resistive elements electrically connected thereto to form of a Wheatstone bridge calibrated to be in equilibrium in strain-free/relaxed states of the elastic element/diaphragm of the pluggable senor device.

The pluggable sensor devices disclosed herein can be implemented using the techniques and embodiments disclosed in international patent publications Nos. WO 2018/235087, titled "sensor elements on thin foils/films", WO 2018/092130, titled "high resistance strain gauges and methods of production thereof", and WO 2018/025264, titled "fluidic microelectromechanical sensors/devices and fabrication methods thereof", which are all of the same applicant hereof, and the disclosure of which is incorporated herein by referenced.

The term fluidic sensor device is used herein to refer to a sensor device configured to interact with fluid substances and measure one or more properties and/or conditions of these fluid substances.

A pluggable sensor device of the present invention can comprise a deformable substrate, at least one transducer element formed on a surface area of a first side of the deformable substrate (e.g., thin film or foil), at least one other transducer element formed on a surface area of a second side of the deformable substrate, and electrical conductors formed on and/or in the substrate for electrically connecting between and to the transducer elements. In some embodiments the transducing elements and their electrical connections are configured on an integrated foil.

Optionally, and in some embodiment preferably, the transducing elements and their electrical connections are configured to form at least one differential measurement circuitry. The sensor device can comprise transducer elements formed on the first side of the substrate, and transducer elements formed on the second side of the substrate. This configuration is exploited in some embodiments to form at least one Wheatstone bridge, optionally at least one full Wheatstone bridge. Accordingly, the transducing elements and their electrical connections can be configured to reside on one side, or on both sides, of the deformable substrate.

Optionally, and in some embodiments preferably, additional sensing elements could be integrated on the same deformable substrate. These additional sensing elements can include temperature sensor(s), conductivity sensor(s), and/or optical transparence sensor(s). By integrating two pressure sensors the pressure difference can be used to calculate flow rate of fluid substances. The deformable substrate could be also used in possible embodiments as a vibration and/or acoustic sensor (microphone).

Optionally, and in some embodiments preferably, additional elements could be integrated inside the device and/or directly on the substrate (on the non deformable portions), such as SMD components, resistors, memory module, ASIC, RF (radio frequency) antenna, energy harvesting modules, Wi-Fi module, BLE module, NFC module, NFMI module, battery, etc. Data/signals communication can be carried out by RF or NFC or NFMI towards an external device. The data/signals communications could also be done acoustically through the measured fluid substances (e.g., water or other flowing media). Energy harvesting can be carried out by the sensor device by using any RF transmitter (e.g., Wi-Fi transmitter, NFC, NFMI, BLE, mobile phone) for a short or a long period of time.

Optionally, and in some embodiments preferably, multiple pluggable sensor devices of the present application can be plugged/attached on the same fluid vessel (e.g., tube, conduit) at different distances, e.g., between two plugged sensor devices on a tube there could be present regular drippers. By combining and analyzing the information from the pluggable sensor devices, additional information could be retrieved (e.g., flow rate, pressure drop, regular drippers occlusion).

The data from the pluggable sensor devices is read in some embodiments by an external reader (e.g., a drone that flies above the pluggable sensor devices, or a dedicated reader device connected to a vehicle/tractor, etc). The external reader can also power the pluggable sensor devise (e.g., by RF energy) and retrieve their measurement data information. The measurement data information retrieved can be sent to the cloud for further analysis (e.g., by AI modules).

Optionally, and in some embodiments preferably, the pluggable sensor device is equipped with a thread (male or female) or a Luer Lock connection, and configured to carry out measurements using the same gauge concept but with a different mechanical connection.

One inventive aspect disclosed herein relates to a sensor device for measuring properties and/or conditions of one or more fluid substances contained, or streamed, inside a fluid vessel. The sensor device comprising a main body portion and an attachment portion. The main body portion comprises a cavity and at least one sensing element operatively mounted inside the cavity for measuring the properties and/or conditions of the one or more fluid substances and generating data/signals indicative thereof. The attachment portion comprises at least one fluid passage, and it is configured to establish fluid communication between a cavity or lumen of the fluid vessel and the cavity of the main body portion through the at least one fluid passage, to thereby enable the one or more fluid substances to interact with the at least one sensing element upon attachment of the sensor device to the fluid vessel.

In some embodiments the at least one sensing element comprises a deformable element having at least one transducer element formed therein or thereon. The sensor device comprises in some embodiments one or more electric circuitries formed in, or on one or more sides, of the deformable element. The one or more electric circuitries can be configured for at least one of data/signals communication (a transmitter and antenna element) and/or energization (using energy harvesting module).

Optionally, at least one of the main body portion, the attachment portion, and the deformable element, are made from a plastic material. The sensor device may comprise one or more electrical conductors formed on and/or in the deformable element for electrically connecting to the least one transducer element.

The at least one transducer element and its at least one electrical conductor are formed in some embodiments on and/or in an integrated multilayered foil or film. Optionally, at least one external layer of the multilayered foil or film is integrated to enable attachment to at least one of the main body and the attachment portions of the sensor device. For example, a multilayer foil or film structure can be used wherein at least one layer can have characteristic configured to allow attachment thereof (e.g., by laser welding) to the external injection molded parts i.e., the main body portion and/or the attachment portion. In addition the at least one layer can have additional characteristic, for example being food grade.

In some embodiments the deformable element and the at least one transducer element are configured to measure pressure conditions obtained inside the cavity of the main body portion upon attachment to the fluid vessel. Optionally, the at least one transducing element and the at least on electrical conductor are configured to form at least one differential pressure measurement sensor.

The attachment portion is configured in some embodiment to be introduced into the fluid vessel through its wall to establish the fluid communication between the cavity or lumen of the fluid vessel and the cavity of the main body portion. Optionally, the main body and/or the attachment portions are configured to permit a determined dripping rate of said one or more fluid substances from the sensor device.

In some embodiments the attachment portion comprises threads configured to attach the sensor device to an opening of the fluid vessel and establish the fluid communication with the cavity of the main body portion through the at least one fluid passage of the attachment portion.

The sensor device comprises in some embodiments a transmitter configured to transmit the signal/data generated by the sensing element to one or more external devices. A network of sensing devices can be constructed using a plurality of the sensor elements having the transmitter, and a monitoring device configured to receive and process the data/signals transmitted from the plurality of sensor elements. Optionally, the network of these sensor devices is configured to communicate the data/signals received from the plurality of sensor elements to a remote computer over a data network. The monitoring device and/or the remote computer can be configured to analyze the received data/signals by an artificial intelligence module.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 1 schematically illustrates a pluggable sensor device, and a network of such devices, according to some possible embodiments;

FIG. 2A to FIG. 2C show schematic illustrations of assembly of a pluggable sensor device according to some possible embodiments;

DETAILED DESCRIPTION OF EMBODIMENTS

Figure 2C:
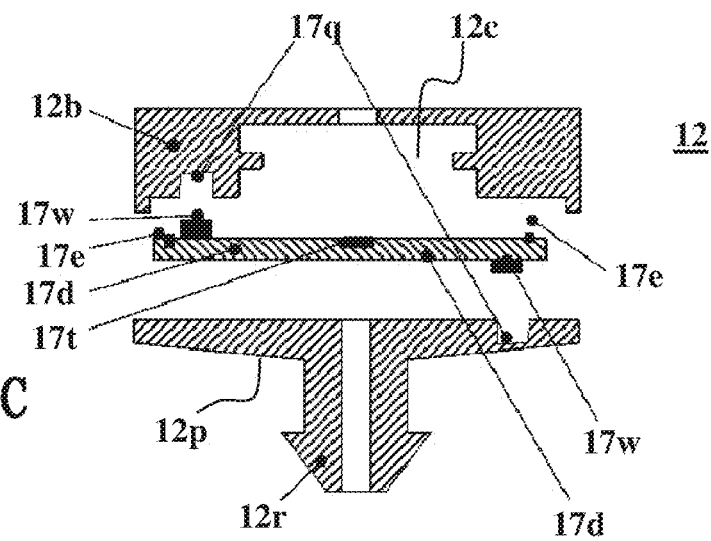

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the pluggable sensor devices, once they understand the principles of the subject matter disclosed herein. This invention may be provided in other specific forms and embodiments without departing from the essential characteristics described herein.

There is a need to integrate sensor devices into plastic applications/products in a compact, simple, and cost-effective manner. The present application provides configurations and fabrication techniques usable for integrating plastic gauge/sensor elements directly into plastic devices and applications/products, where the integration of the sensor elements is direct and do not require packaging of the sensing elements before the integration. In some embodiments the sensor elements are implemented in/on an elastic element mounted in the sensor device and configured to interact with fluid substances introduced thereinto and thereby measure one or more properties and/or conditions of the fluid substances.

In some embodiments the elastic element in/on which the sensor elements are implemented is mounted in a pluggable plastic structure or assembly having an inner cavity and configured for attachment to a fluid vessel and establish fluid communication with a cavity or a lumen thereof. The elastic element is implemented in some embodiments using a plastic diaphragm. The elastic element is configured in some embodiments to elastically deform responsive to pressure conditions evolving inside the sensor device after the pluggable plastic structure/assembly is attached to the fluid vessel and fluid communication is established therewith.

Possible embodiments of the sensor elements of the present application are designed for mass production as an array of sensor elements arranged in row and columns on a deformable substrate. One or more diaphragm sensors can be easily cut from the array of sensor elements, each being readily operable for mounting in a respective pluggable plastic structure/assembly for attachment to a fluid vessel.

In some embodiments the sensor elements are implemented using electrically conducting patterns formed over one or two sides of a thin multilayered polymeric film or foil used as a deformable element. Optionally, and in some embodiments preferably, one (e.g., resistive) sensing element is formed on a first side of the foil/film, and at least one other (e.g., resistive) sensing element is formed on a second side of the foil/film. Electrically conductive elements can be integrated inside the foil/film to electrically connect between the sensor elements formed on its first and second sides, and to allow calibration, trimming, conductivity, connectivity, and to carry out other electrical operations of the sensor device.

In some embodiments two or more sensing elements are formed on a first side of the foil/film, and two other sensing elements are formed on the second side of the foil/film, and the sensing elements formed on the first and second sides of the foil/film are electrically connected to each other by electrically conducting lines and vias.

The pluggable sensor device configurations according to some possible embodiments provide substantially inexpensive and compact gauge sensors implemented on/in at least one side of an elastically deformable diaphragm with simple and easy integration into plastic products, utilizing differential measurement circuitries (e.g., a Wheatstone bridge) for pressure sensing, and usable for measurement of pressure conditions. Different integration techniques can be advantageously used to achieve easy and cost effective implementation of the sensing deformable diaphragm in plastic products by using plastic attachment techniques (such as gluing, laser welding, over molding, hot welding, ultrasonic welding, etc.) or mechanical attachment techniques (such as by pressing, Snap-fit, fastener, etc.).

For an overview of several example features, process stages, and principles of the invention, the pluggable structures/assemblies examples illustrated schematically and diagrammatically in the figures are intended for a fluidic sensor devices. These structures/assembles are shown as one example implementation that demonstrates a number of features, processes, and principles used to provide a pluggable sensor device, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in fluidic device applications may be suitably employed, and are intended to fall within the scope of this disclosure.

FIG. 1 schematically illustrates a pluggable sensor device 12 configured for attachment to a fluid vessel 11, and establishing fluid communication therewith. Particularly, the pluggable sensor device 12 comprises a pluggable structure/assembly (housing) 12h having a cavity 12c, and one or more sensing elements 17 mounted inside the cavity 12c for measuring one or more properties and/or conditions of fluid substances introduced thereinto. The pluggable structure/assembly 12h comprises a fluid coupling passage 12s configured to stablish fluid communication between its cavity 12c and the cavity/lumen 11c of the fluid vessel 11 upon attachment of the pluggable structure/assembly 12h thereto. Optionally, but in some embodiments preferably, the pluggable structure/assembly is made of one or more plastic materials.

In some embodiments one or more electrical contacts, and/or circuitries, 12u are formed on the pluggable structure/assembly 12h to electrically couple to the one or more sensing elements 17 and reading measurement data/signals thereby generated by establishing direct contact therewith, and/or using wireless communication techniques. For example, and without being limiting, the circuitries 12u formed on, and/or in, the pluggable structure/assembly 12h can comprise a transmitter 12m configured to transmit the signals/data generated by the one or more sensing elements 17 to an external (e.g., monitoring) device 14 e.g., using RF antenna.

As exemplified in FIG. 1, a sensing setup 10 is created upon attachment of the pluggable structure/assembly 12h to the fluid vessel 11 in which fluid communication is established between the cavity 12c of the pluggable structure/assembly 12h and the cavity/lumen 11c of the fluid vessel 11. In this sensing setup 10 fluid substances 11f contained/streamed inside the fluid vessel 11 can interact with the one or more sensing elements 17 of the pluggable sensor device 12 for measuring properties/conditions thereof. FIG. 1 further demonstrate construction of a network 19 of sensing setups 10, 10a, . . . , 10c, each comprising a pluggable sensor device 12 attached and fluidly coupled to a respective, or the same, fluid vessel 11, and configured to transmit signals/data generated by their respective sensing elements 17 to at least one external device 14.

For example, and without being limiting, the external device 14 may comprise a communication module 14n configured to receive the data/signals from the one or more sensing setups 10, 10a, . . . , 10c, and one or more processors 14c and memories 14m configured and operable to execute software instructions for receiving and/or processing the transmitted signals/data received in the communication module 14n. The received and/or processed signals/data can be stored inside the memory 14m of the device 14, and/or transmitted over a data network (e.g., the Internet) 15 to a remote computer machine/server (not shown). In some possible embodiments the signals/data transmitted over the data network 15 is used in a learning process (e.g., by artificial intelligence—AI) for monitoring and/or identifying patterns in the measured signals/data indicative of operational states of the fluid vessel(s) 11, and which may require external control/intervention.

FIGS. 2A and 2B schematically illustrate construction of a pluggable sensor device 12 according to some possible embodiments. in this specific and non-limiting example the pluggable structure/assembly 12h is constructed from a plugging element (also referred to herein as attachment portion) 12p having a coupling member 12r downwardly extending therefrom, and a cup (encapsulation) member (also referred to herein as a main body portion) 12b configured to sealably connect to an upper surface of the plugging element 12p and thereby form an inner cavity 12c. One or more sensor elements 17 placed inside the cavity 12c are configured to interact with fluid substances introduced into the cavity 12c through the fluid passage 12s formed in the coupling member 12r. The sensor elements 17 can be implemented by a deformable element 17d having one or more transducer elements 17t formed thereon or therein. Optionally, an upper opening is provided in the cup member 12b for differentiation with the atmospheric pressure.

In some embodiments the cavity 12c of the cup member 12b comprises an internally radially protruding leap 12i configured for sealably attaching the deformable element 17d inside the cavity 12c. The elements of the pluggable sensor device 12 can be attached to each other utilizing various different plastic attachment techniques, e.g., ultrasonic welding, laser welding, gluing, over molding etc. As exemplified in FIG. 2B, the deformable element 17d can be attached (18) to the protruding leap 12i by welding, molding, over molding, or pressed mechanically. A O-ring may be used to guarantee sealing between the deformable element 17d and other plastic parts in the pluggable sensor device 12. The deformable element 17d is made in some embodiments of a multi layered foil/film and its outer layers are designed to enable the attachment (e.g., by welding) to the inner leap 12i.

The lower side of the cup member 12b comprises in some embodiments an axially protruding rim 12f configured for attachment to the plugging element 12p and forming a bottom cavity 12q between the deformable element 17d and the cup member 12b. The plugging member 12p can be attached (17) to the rim 12f by welding, molding, over molding, or pressed mechanically. A O-ring may be used to guarantee sealing between the rim 12f and the plugging member 12p. The pluggable sensor device 12 can be configured to allow (e.g., as an irrigation dripper) or prevent drip of the fluid substances (e.g., water) therefrom. For example, the deformable element 17d can be integrated inside a dripper unit, or alternatively, the pluggable sensor device 12 can be structured in a way that can allow it to be used as both a dripper and a sensor.

FIG. 2C demonstrates a pluggable sensor device 12 with additional components formed on the deformable element 17d e.g., for communication, energization, and/or readout. The deformable element 17d comprises in this non-limiting example circuitries 17w and/or antenna elements 17e, mounted on the upper and/or the bottom side of the deformable element 17d. As also seen in FIG. 3C, the circuitries 17w and/or antenna elements 17e are mounted at areas of the deformable element 17d that are substantially not affected by the deformations (outside the cavity 12c), and the cup member 12b and/or the plugging element 12p may be configured to include cavities 17q configured to accommodate the circuitries 17w and/or antenna elements 17e of the deformable element 17d, when the components of the device 12 are assembled.

Figure 3A:
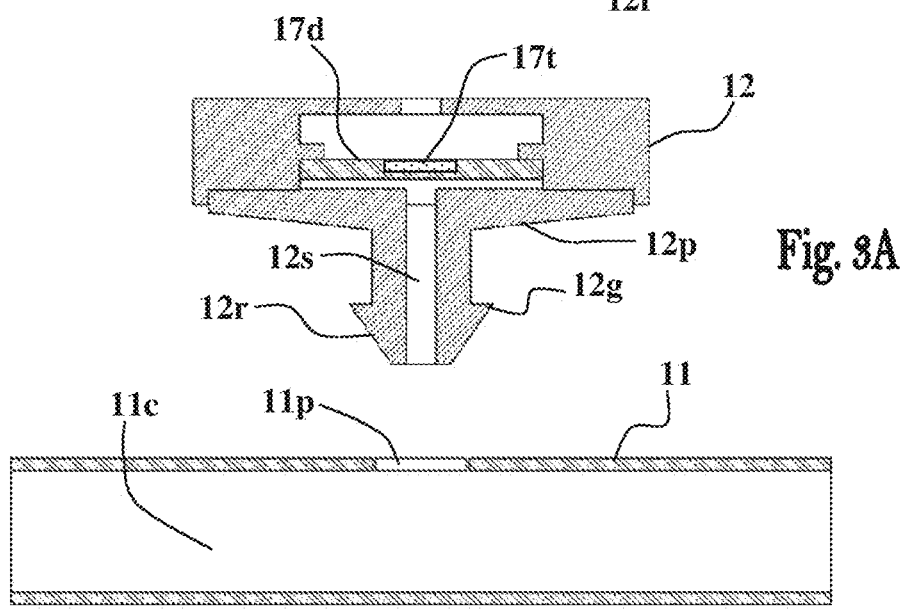
FIGS. 3A and 3B schematically illustrate attachment of the pluggable sensor device to a fluid vessel according to some possible embodiments.
Figure 3B:
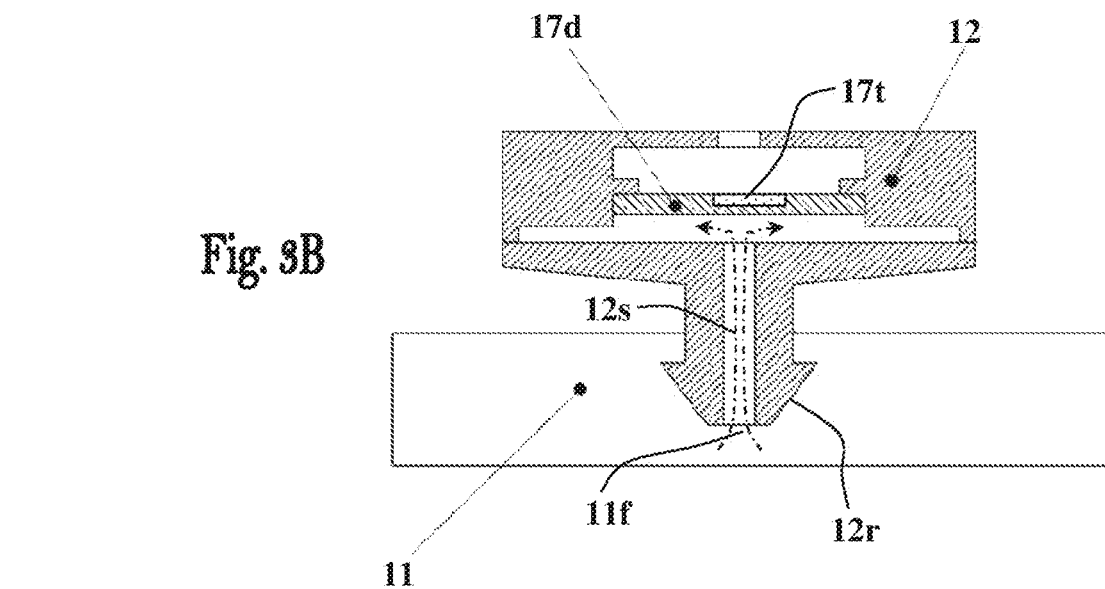

FIGS. 3A and 3B demonstrate the attachment of the pluggable sensor device 12 to a fluid vessel 11. In this specific and non-limiting example the plugging member 12r is configured to be introduced through the wall of the fluid vessel 11 for placing its extremity inside the cavity/lumen 11c of the fluid vessel 11. Optionally, an opening 11p is formed in the wall of the fluid vessel 11 for introducing the extremity of the plugging member 12r inside the cavity 11c. Additionally, or alternatively, the extremity of the plugging member 12r can be configured to pierce through the wall of the fluid vessel 11 to thereby form the opening 11p. The extremity of the of the plugging member 12r can be configured to sealingly anchor the device to the opening 11p e.g., by a frustoconical/distally tapering element having an anchoring flange 12g.

Figure 4A:
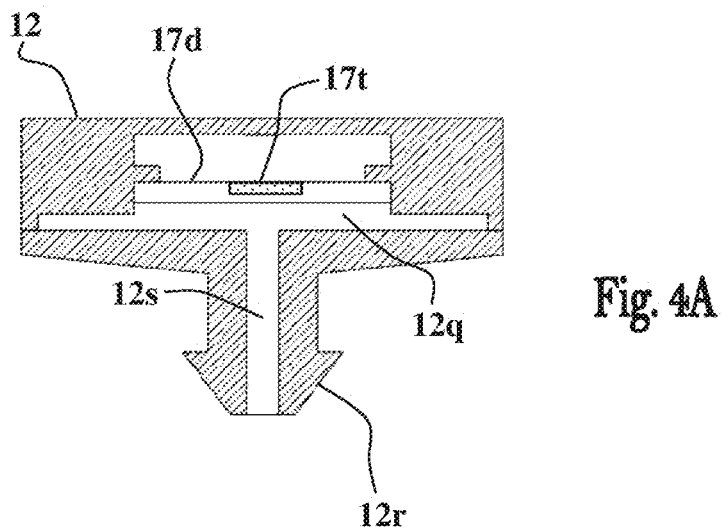
FIGS. 4A and 4B schematically illustrate operation of a pluggable pressure sensor device according to some possible embodiments.
Figure 4B:
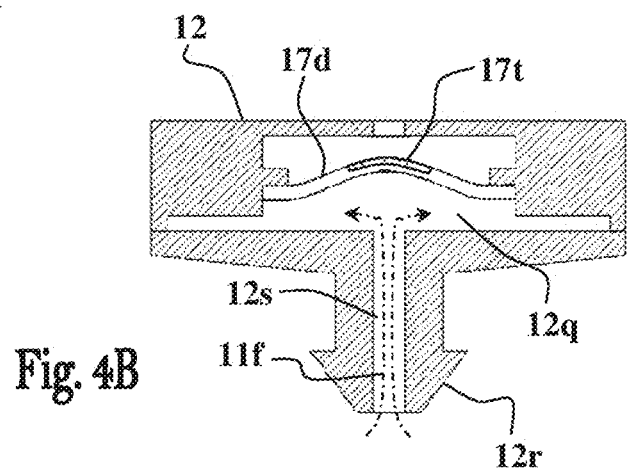

FIGS. 4A and 4B schematically illustrate the mechanical behavior of the deformable element 17d used as a pressure sensor. As seen in FIG. 4A, when no pressure is applied inside the bottom cavity 12q, the deformable element 17d is not subject to any deformations. FIG. 4B exemplifies the situation when pressure is applied (either positive or negative) inside the bottom cavity 12q causing deformations in the deformable element 17d and the transducer elements 17t implemented therein/on. The amount of deformations caused is related to the intensity of the pressure and thus measured by the transducer elements 17t. The direction of the deformation is related to the direction of the pressure (positive or negative pressure).

Figure 5A:
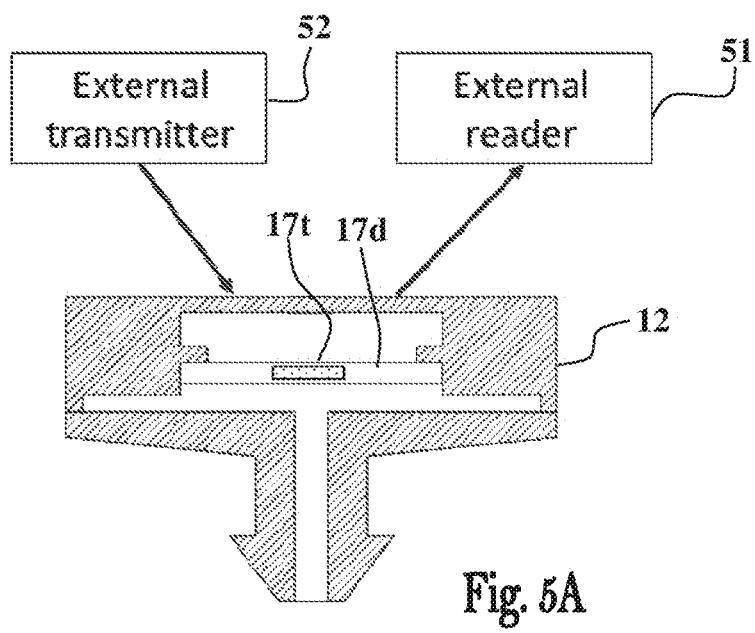
FIGS. 5A and 5B schematically illustrate communication of data/signals between the pluggable sensor device and external modules/devices.

FIG. 5A is schematically illustrating coupling between the pluggable sensor device 12 and external modules, e.g., by RF, WiFi, NFC, NFMI, or BLE, for the purpose of signals/data communication and/or energy harvesting. In this specific and non-limiting example, an external transmitter 52 is used to transmit signals/data (e.g., by RF radiation) to the pluggable sensor device 12, and an external reader 51 is used for receiving signals/data transmitted by the pluggable sensor device 12 (e.g., by RF radiation). The communication with the external devices, 51 and/or 52, can be achieved by integrating additional elements (e.g., 12u and 12m shown in FIG. 1 and/or 17w and 17e in FIG. 2C) inside the device 12 and/or directly on the deformable element 17d (on the non deformable portions thereof), such as SMD components, resistors, memory module, ASIC, RF antenna, energy harvesting modules, Wi-Fi module, BLE module, battery, etc.

Figure 5B:
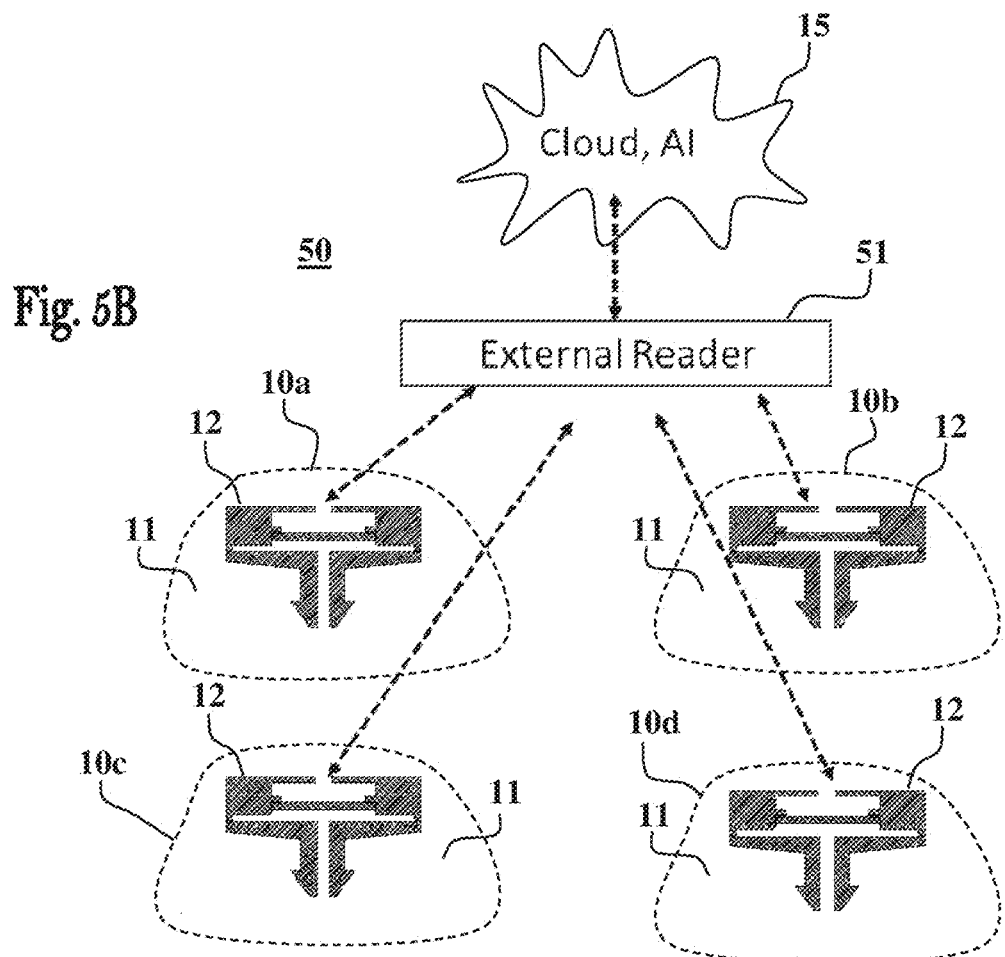

FIG. 5B schematically illustrates a network 50 of multiple sensing setups 10a, 10b, . . . , 10d, each comprising a pluggable sensor device 12 attached and fluidly coupled to a respective, or the same, fluid vessel 11 e.g., at different distances. The measurement signals/data generated by each pluggable sensor device 12 is transmitted from the pluggable sensor device 12 and read by at least one external reader 51. Optionally, and in some embodiments preferably, the at least one external reader 51 is further configured to power the set of pluggable sensor device 12 (e.g., by RF energy) and also receive the signals/data thereby transmitted. The signals/data received from the pluggable sensor device 12 can be transferred to the cloud over the network 15 for further analysis (e.g., by AI modules).

Figure 6A:
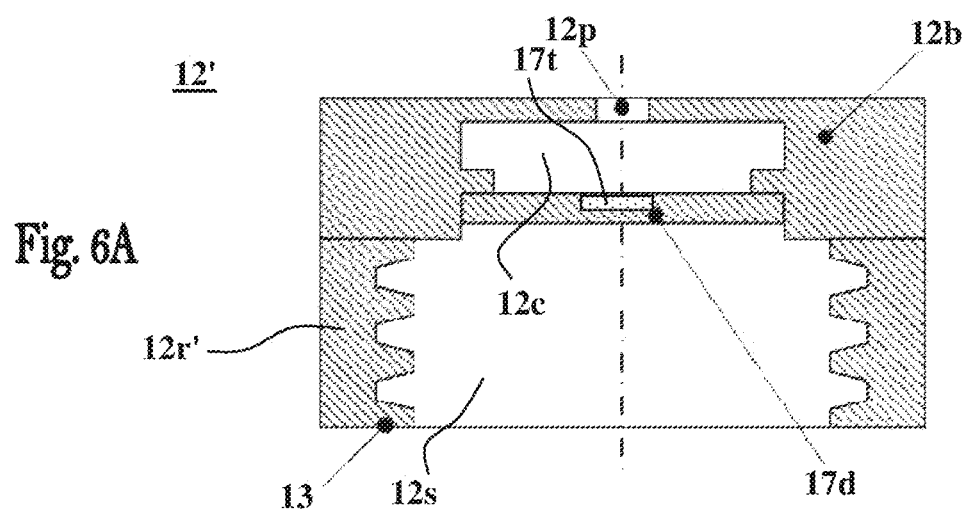
FIGS. 6A to 6D schematically illustrate pluggable sensor devices according to other possible embodiments.
Figure 6B:
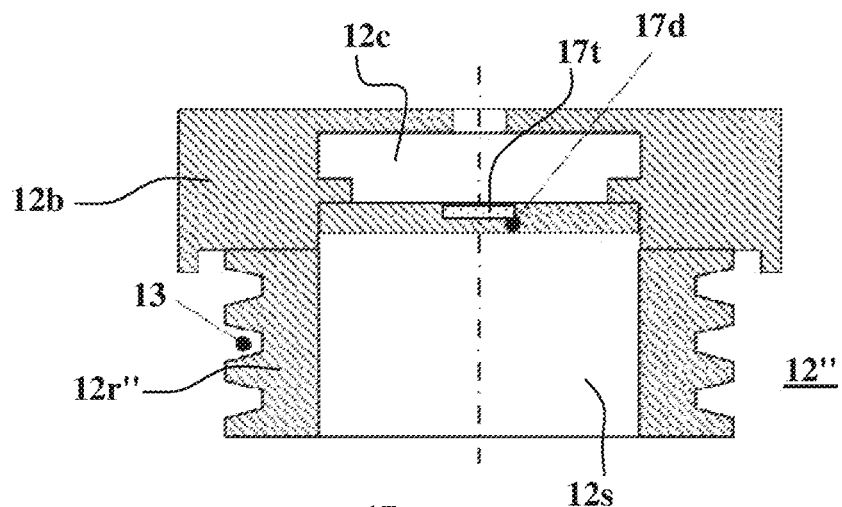

FIGS. 6A and 6B schematically illustrate pluggable sensors devices 12' and 12", respectively, wherein the plugging members, 12r' and 12r", are implemented by hollow elements having threads (female or male) 13, instead of the anchoring flange (12g in FIG. 3A). The pluggable sensors devices 12' and 12" in this example are using the same measurement/sensing principles described hereinabove, but using mechanical connection having threads 13. Accordingly, the pluggable sensor devices 12' and 12", can be threaded e.g., on a dispensing opening of a fluid container/bottle (e.g., as shown in FIG. 7).

Figure 6C:
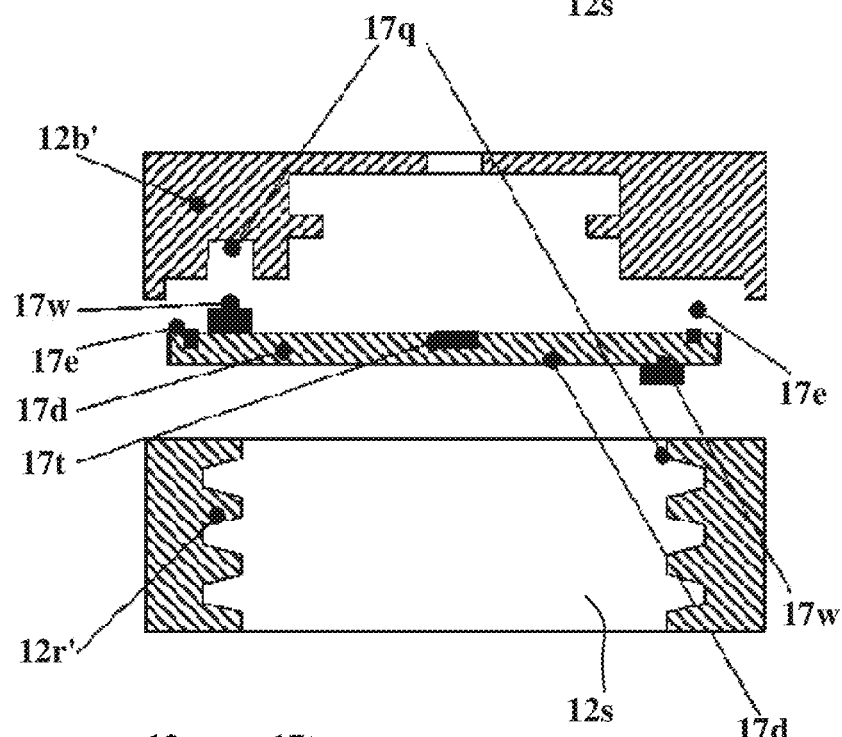

FIG. 6C shows the pluggable sensor device 12' with the additional components e.g., circuitries 17w and/or antenna elements 17e, mounted on the upper and/or the bottom side of the deformable element 17d e.g., for communication, energization, and/or readout. As exemplified hereinabove, the circuitries 17w and/or antenna elements 17e can be mounted at areas of the deformable element 17d that are substantially not affected by the deformations (outside the cavity 12c), and the cup member 12b and/or the plugging element 12p may be configured to include cavities 17q configured to accommodate the circuitries 17w and/or antenna elements 17e of the deformable element 17d, when the components of the device 12' are assembled.

Figure 6D:
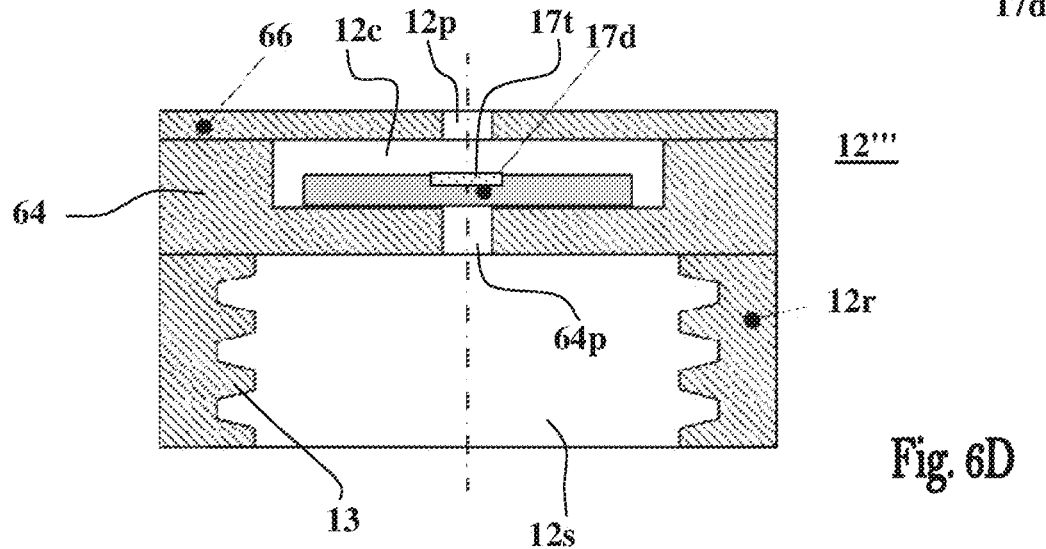

FIG. 6D schematically illustrates another possible embodiment of a pluggable sensor device 12''' having threads 13, having an inverted cup member 64 with a fluid passage 64p configured to fluidly communicate between the cavity 12c of the inverted cup member 64 and the fluid passage 12s of the plugging member 12r. In this embodiments the deformable element 17d is sealably attached to the floor of the inverted cup member 64 over the fluid passage 64p such that fluid substances introduced into the fluid passage 12s of the plugging member 12r interact with deformable element 17d for measurement of the properties/conditions of the fluid substances by the transducer elements 17t implemented in/on the deformable element 17d.

Figure 7:
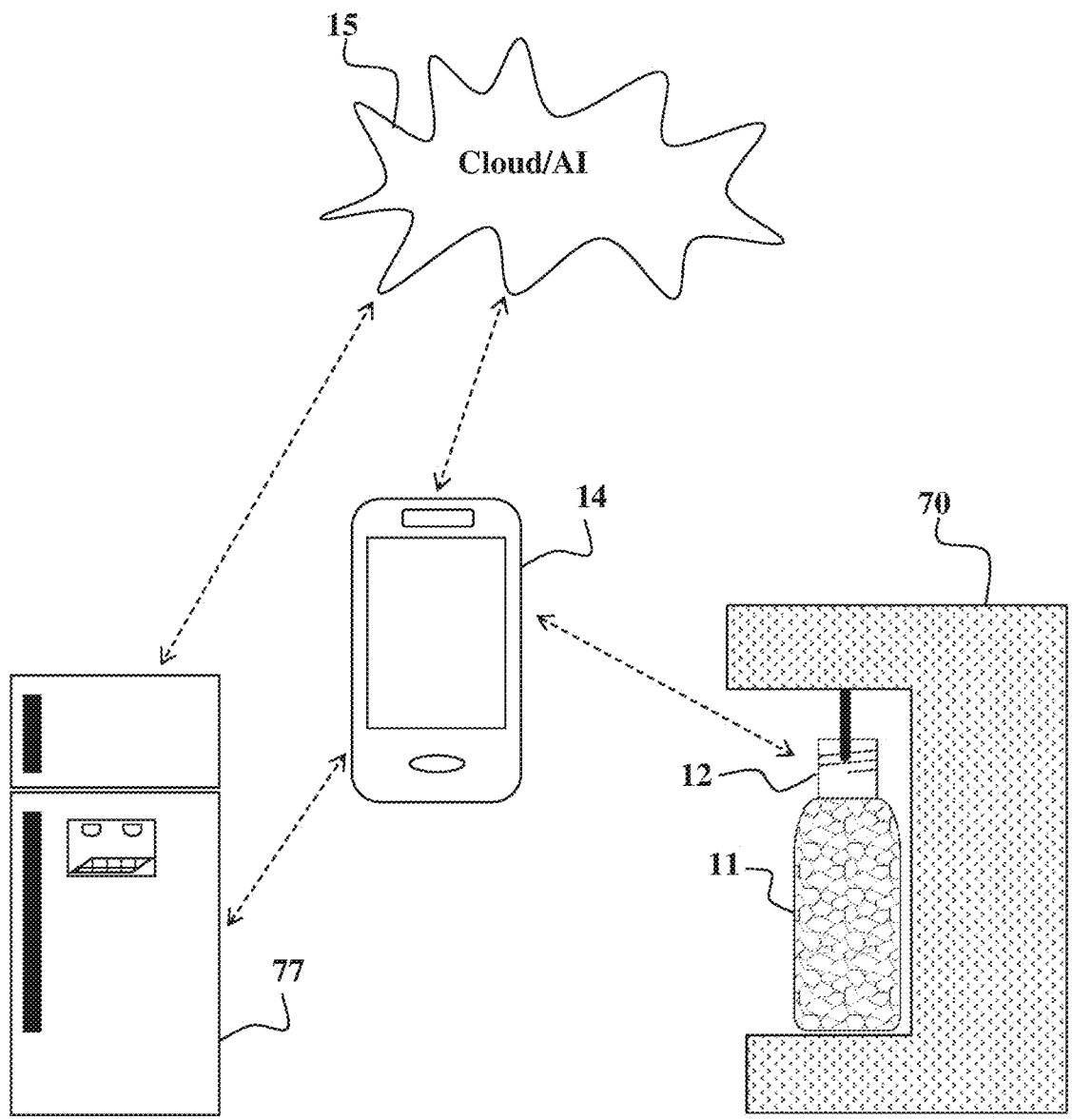
FIG. 7 exemplifies usage of a pluggable sensor device according to some possible embodiments.

FIG. 7 schematically illustrates a usage example, where a pressure and/or temperature sensor are integrated inside a cap 12 of a pressurized bottle 11. The pressure and temperature readings are wirelessly transmitted to a smart device (e.g., phone) 14 and/or to the cloud 15. The power source could be a small battery (not shown) provided inside the cap 12, or an energy harvesting module (not shown) integrated inside the cap 12, based on available Wi-Fi power or Bluetooth or NFC from the refrigerator and/or the smartphone. Also seen in this non-limiting example, a refrigerator 77 configured to read measurement data of one or more fluid vessels (e.g., 11) placed thereinside using a reader (e.g., 51 in FIG. 5A) configured to transmit the measurement data to the smart device 14 (and/or to the cloud 15) to present to a the user the state of each fluid vessel (e.g., fluid amount, pressure and/or temperature inside). The refrigerator can thus act as a hub as it communicate data with the fluid vessels (e.g., bottles) placed thereinside, and also with the cloud 15 and/or smart device 14 (and/or a smart home hub).

Terms such as top, bottom, front, back, right, and left and similar adjectives in relation to orientation of the device and components thereof, refer to the manner in which the illustrations are positioned on the paper, not as any limitation to the orientations in which the apparatus can be used in actual applications.

It should also be understood that throughout this disclosure, where a process or method is shown or described, the steps of the method may be performed in any order or simultaneously, unless it is clear from the context that one step depends on another being performed first.

As described hereinabove and shown in the associated figures, the present application provides pluggable sensor designs, particularly useful for pressure measurement, and related connections and integrations. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A sensor device for measuring properties and/or conditions of one or more fluid substances contained, or streamed, inside a fluid vessel, the sensor device comprising:

at least one sensing element comprising a deformable element having at least one transducer element formed therein or thereon;

a main body portion having a cavity and said at least one sensing element operatively mounted inside said cavity for measuring the properties and/or conditions of said one or more fluid substances and generating data/signals indicative thereof; and one or more electrical conductors formed on and/or in said deformable element for electrically connecting to said at least one transducer element;

an attachment portion having at least one fluid passage, said attachment portion configured to establish fluid communication between a cavity or lumen of said fluid vessel and the cavity of said main body portion through said at least one fluid passage, to thereby enable said one or more fluid substances to interact with said at least one sensing element upon attachment of said sensor device to said fluid vessel, wherein said at least one transducer element and at least one of the electrical conductors electrically connecting thereto are formed on and/or in an integrated multilayered foil or film.

2. The sensor device of claim 1 comprising one or more electric circuitries formed in, or on one or more sides, of the deformable element.

3. The sensor device of claim 2 wherein the one or more electric circuitries are configured for at least one of data/signals communication and/or energization.

4. The sensor device of claim 2, wherein at least one of the main body portion, the attachment portion, and the deformable element, are made from a plastic material.

5. The sensor device of claim 1 wherein at least one external layer of the multilayered foil or film is integrated to enable attachment to at least one of the main body and the attachment portion of the sensor device.

6. The sensor device of claim 1 wherein the deformable element and the at least one transducer element are configured to measure pressure conditions obtained inside the cavity of the main body portion upon attachment to the fluid vessel.

7. The sensor device of claim 6 wherein the at least one transducer element and the at least one electrical conductor are configured to form at least one differential pressure measurement sensor.

8. The sensor device of claim 1 wherein the attachment portion comprises threads configured to attach said sensor device to the fluid vessel and establish the fluid communication with the cavity of the main body portion through the at least one fluid passage of said attachment portion.

9. The sensor device of claim 1 comprising a transmitter configured to transmit the data/signals generated by the sensing element to one or more external devices.

10. A network of sensing devices comprising: a plurality of sensor devices according to claim 9; and a monitoring device configured to receive and process the data/signals transmitted from said plurality of sensor devices.

11. The network of claim 10 configured to communicate the data/signals received from the plurality of sensor devices to a remote computer over a data network.

12. The network of claim 10 wherein the monitoring device and/or the remote computer are configured to analyze the received data/signals by an artificial intelligence module.

13. A sensor device for measuring properties and/or conditions of one or more fluid substances contained, or streamed, inside a fluid vessel, the sensor device comprising:

a main body portion having a cavity and at least one sensing element operatively mounted inside said cavity for measuring the properties and/or conditions of said one or more fluid substances and generating data/signals indicative thereof; and an attachment portion having at least one fluid passage, the attachment portion is configured to be introduced into the fluid vessel through its wall to establish the fluid communication between the cavity or lumen of the fluid vessel and the cavity of the main body portion through said at least one fluid passage, to thereby enable said one or more fluid substances to interact with said at least one sensing element upon attachment of said sensor device to said fluid vessel, wherein the main body and/or the attachment portion are configured to permit a determined dripping rate of said one or more fluid substances from the sensor device.

14. The sensor device of claim 13 wherein the attachment portion comprises threads configured to attach said sensor device to the fluid vessel and establish the fluid communication with the cavity of the main body portion through the at least one fluid passage of said attachment portion.

15. The sensor device of claim 13 comprising a transmitter configured to transmit the data/signals generated by the sensing element to one or more external devices.

16. A network of sensing devices comprising: a plurality of sensor devices according to claim 15; and a monitoring device configured to receive and process the data/signals transmitted from said plurality of sensor devices.

17. The network of claim 16 configured to communicate the data/signals received from the plurality of sensor devices to a remote computer over a data network.

18. The network of claim 16 wherein the monitoring device and/or the remote computer are configured to analyze the received data/signals by an artificial intelligence module.

* * * * *